(12) United States Patent
Correll et al.

(10) Patent No.: US 12,226,894 B2
(45) Date of Patent: Feb. 18, 2025

(54) SUBMERSIBLE REMOTE OPERATED VEHICLE TOOL INTERCHANGE

(71) Applicant: FMC Technologies, Inc., Houston, TX (US)

(72) Inventors: Richard Brian Correll, Woodland, CA (US); William P. Klassen, Davis, CA (US); Clayton Paul Kleppinger, Woodland, CA (US); Philip David Langley, Granite Bay, CA (US); Justin Daniel Schmaljohann, Davis, CA (US); Ryan Mitchell Bosler, Sacramento, CA (US); William Dawson Kesling, Davis, CA (US); Chris Alexander Ade, Davis, CA (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 18/220,017

(22) Filed: Jul. 10, 2023

(65) Prior Publication Data

US 2024/0075636 A1    Mar. 7, 2024

Related U.S. Application Data

(63) Continuation of application No. 17/660,955, filed on Apr. 27, 2022, now Pat. No. 11,731,289, which is a
(Continued)

(51) Int. Cl.
*B25J 15/04*    (2006.01)
*B63C 11/52*    (2006.01)
*B63G 8/00*    (2006.01)

(52) U.S. Cl.
CPC ........ *B25J 15/0408* (2013.01); *B25J 15/0433* (2013.01); *B63C 11/52* (2013.01); *B63G 8/001* (2013.01); *B63G 2008/002* (2013.01)

(58) Field of Classification Search
CPC B25J 15/0408; B25J 15/0433; B25J 19/0041; B25J 19/0045; B63C 11/52; B63G 2008/002
See application file for complete search history.

(56) References Cited

U.S. PATENT DOCUMENTS

| 4,897,014 A | 1/1990 | Tietze |
| 8,900,106 B2 | 12/2014 | McCoy, Jr. et al. |

(Continued)

FOREIGN PATENT DOCUMENTS

| CN | 102143828 A | 8/2011 |
| CN | 103249592 A | 8/2013 |

(Continued)

OTHER PUBLICATIONS

PCT International Search Report and Written Opinion in International Application No. PCT/US2020/026,617, dated Jul. 17, 2020, 12 pages.

*Primary Examiner* — Andrew Polay
(74) *Attorney, Agent, or Firm* — Fish & Richardson P.C.

(57) ABSTRACT

A tool interchange for a submersible remote operated vehicle (ROV) arm includes a first interchange body that affixes to an ROV arm. A second interchange body is carried by the first interchange body to rotate on a rotation axis. The second interchange body includes a tool mount actuable between gripping an ROV tool to the second interchange body and releasing the ROV tool from the second interchange body. An inductive power coupling part is provided in the tool mount. The inductive power coupling part is presented outwardly in the tool mount opposite the first interchange body, resides on the rotation axis and is fixed with respect to the first interchange body while the second interchange body rotates. The inductive power coupling part is adapted to inductively communicate power with a corre- (Continued)

sponding inductor power coupling part of the ROV tool when the ROV tool is docked in the tool mount.

16 Claims, 5 Drawing Sheets

Related U.S. Application Data continuation of application No. 16/376,622, filed on Apr. 5, 2019, now Pat. No. 11,318,624.

(56) References Cited

U.S. PATENT DOCUMENTS

| | | |
|---|---|---|
| 9,929,777 B2 | 3/2018 | Jaskolski et al. |
| 10,272,980 B2 | 4/2019 | Abdellatif et al. |
| 10,286,566 B2 | 5/2019 | Williams |
| 11,318,624 B2 | 5/2022 | Correll et al. |
| 11,731,289 B2 | 8/2023 | Correll et al. |
| 2005/0145389 A1 | 7/2005 | Barrow et al. |
| 2007/0273319 A1 | 11/2007 | Scheible et al. |
| 2011/0256995 A1 | 10/2011 | Takazakura et al. |
| 2015/0204167 A1 | 7/2015 | Skeels et al. |
| 2017/0095937 A1 | 4/2017 | Williams |
| 2017/0120454 A1 | 5/2017 | Ferguson et al. |
| 2019/0224858 A1* | 7/2019 | Hansen ............... B25J 15/0408 |
| 2020/0317311 A1 | 10/2020 | Correll et al. |
| 2022/0250256 A1 | 8/2022 | Correll et al. |

FOREIGN PATENT DOCUMENTS

| | | |
|---|---|---|
| CN | 106217398 A | 12/2016 |
| CN | 106232305 A | 12/2016 |
| CN | 108974292 A | 12/2018 |
| WO | WO 2007045914 | 4/2007 |
| WO | WO 2019144137 | 7/2019 |

\* cited by examiner

SUBMERSIBLE REMOTE OPERATED VEHICLE TOOL INTERCHANGE

CROSS-REFERENCE TO RELATED PATENT APPLICATIONS

This application is a continuation of and claims the benefit of priority to U.S. patent application Ser. No. 17/660,955, filed Apr. 27, 2022, which is a continuation of and claims the benefit of priority to U.S. patent application Ser. No. 16/376,622, filed Apr. 5, 2019 (now U.S. Pat. No. 11,318,624), the contents of which are incorporated by reference herein

BACKGROUND

In petrochemical exploration and production, many offshore wells are at depths well beyond the reach of divers. In these instances, a submersible remote operated vehicle (ROV) is controlled from above the water's surface to perform some operations in the construction and control of the wells. The ROV has a manipulator arm that can mount tools for use in performing these operations. Some manipulator arms have the capability to remotely release from and attach to tools, so that different tools can be interchanged while the ROV is subsea.

BRIEF DESCRIPTION OF THE DRAWINGS

Throughout the figures, like reference numbers are used to indicate the like parts.

DETAILED DESCRIPTION

Figure 1:
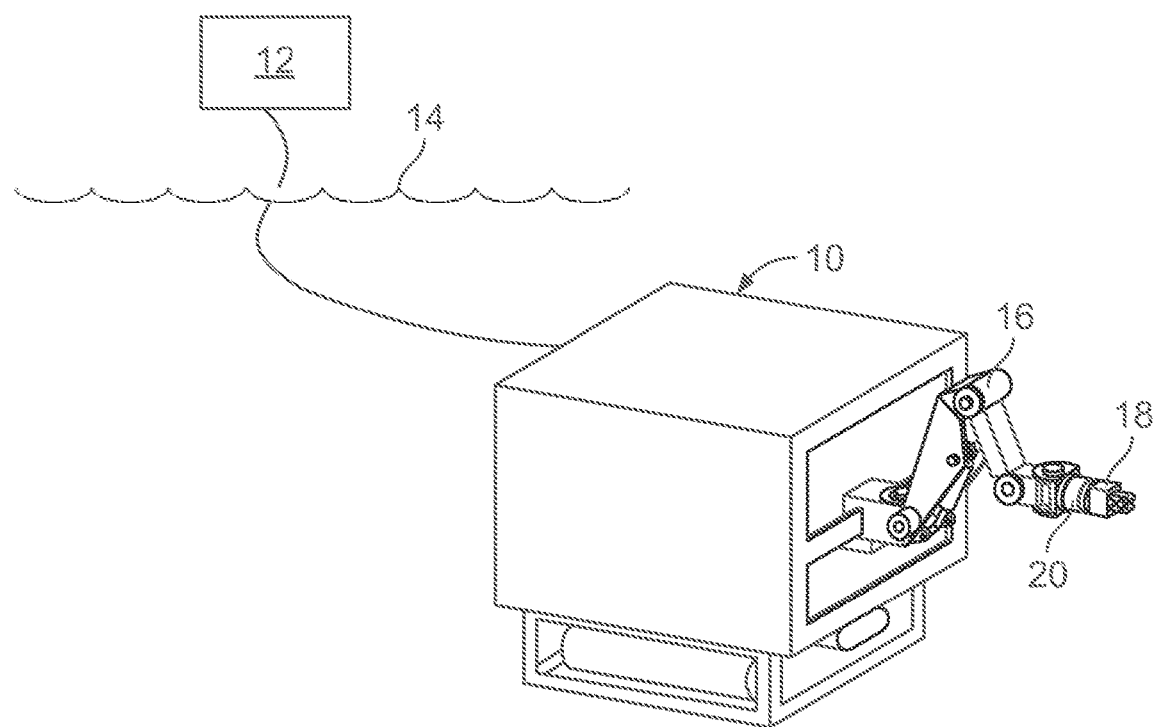
FIG. 1 is a perspective view of a submersible remote operated vehicle (ROV) operating subsea.

FIG. 1 shows an example submersible (e.g., a subsea-type) remote operated vehicle (ROV) 10. The ROV 10 can be controlled by a human operator from a remote location 12, typically above a surface 14 of a body of water, to swim through the water and perform certain operations. The ROV 10 of FIG. 1 includes a manipulator arm 16 with a tool 18 attached to its end. In certain instances, the ROV can include one or more additional arms, such as a grabber or other type of arm, but the manipulator arm 16 is the most dexterous, having multiple pivot and rotational joints that enable movement of the arm in multiple degrees of freedom.

The ROV 10 supplies power, e.g., electrical and/or hydraulic power, to the tool 18 through the manipulator arm 16, enabling the operator to actuate and operate the tool 18. Likewise, the tool 18 and ROV 10 communicate data, including output from sensors in the tool 18, control signals to actuators in the tool 18, and other data, via the manipulator arm 16.

FIG. 1 shows the tool 18 as a jaws with two parts that can be operated to open and close to grasp and hold objects. But, there are a multitude of different tools that can be used with an ROV, including torque tools, cutters and other tools. The concepts herein encompass a tool interchange 20 that mounts at the end of the manipulator arm 16, between the manipulator arm 16 and the tool 18, becoming the interface between the arm 16 and the tool 18. The tool interchange 20 enables the ROV 10 to change out tools 18 while submersed with no outside assistance. For example, the operator can operate the manipulator arm 16 to dock the tool 18 into a tool storage unit. The tool storage unit may be on and/or off the ROV. The operator can then actuate the tool interchange 20 to release the tool from the manipulator arm 16, withdraw the manipulator arm 16 and leave the tool 18 in the tool storage unit. The operator can then operate the manipulator arm 16 to dock in a different tool 18, and actuate the tool interchange 18 to grip and lock into the new tool 18. Thereafter, the operator can use the different tool 18 in performing operations.

Figure 2A:
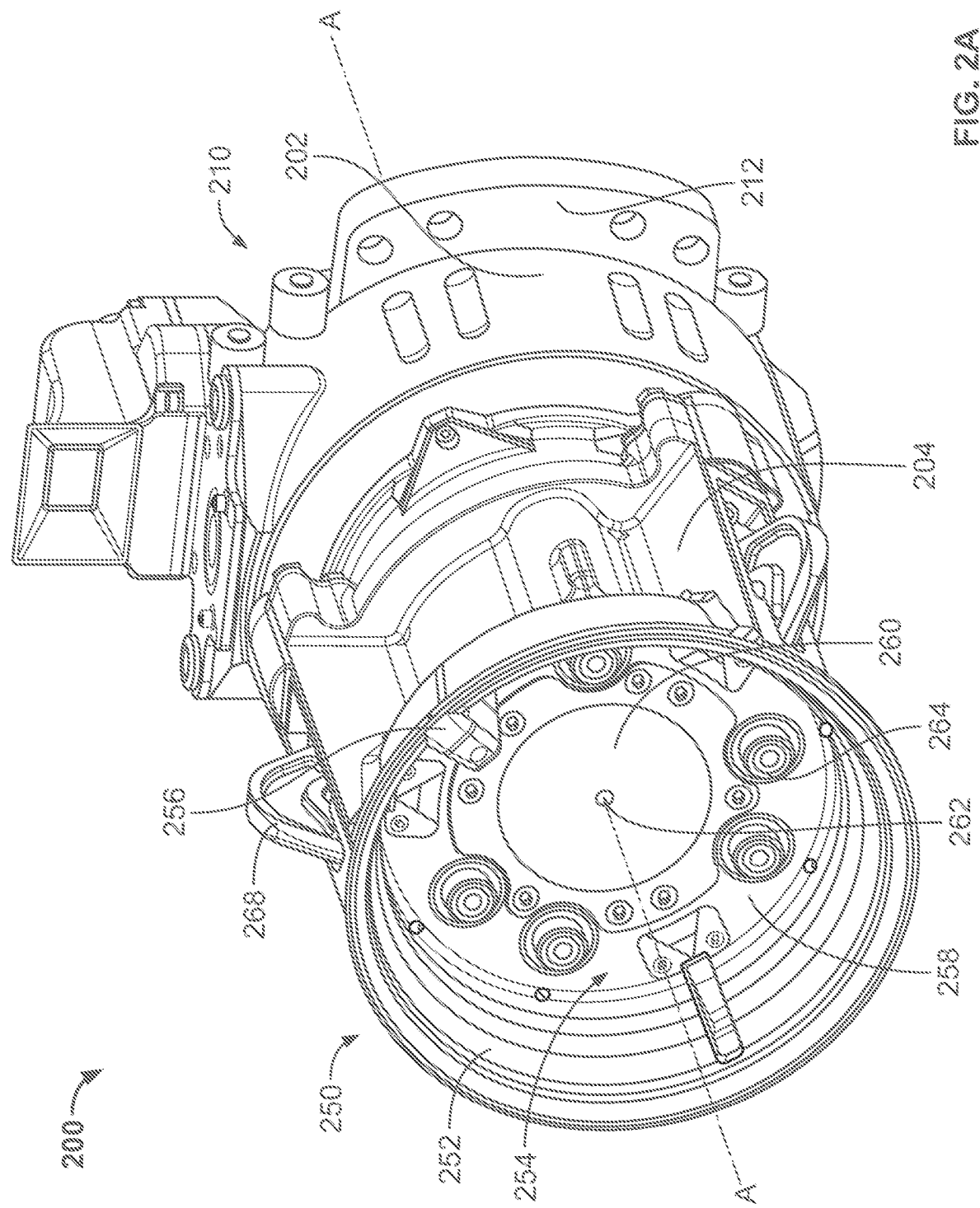
FIG. 2A is a front, top perspective view of an example tool interchange constructed in accordance with the concepts herein.
Figure 2B:
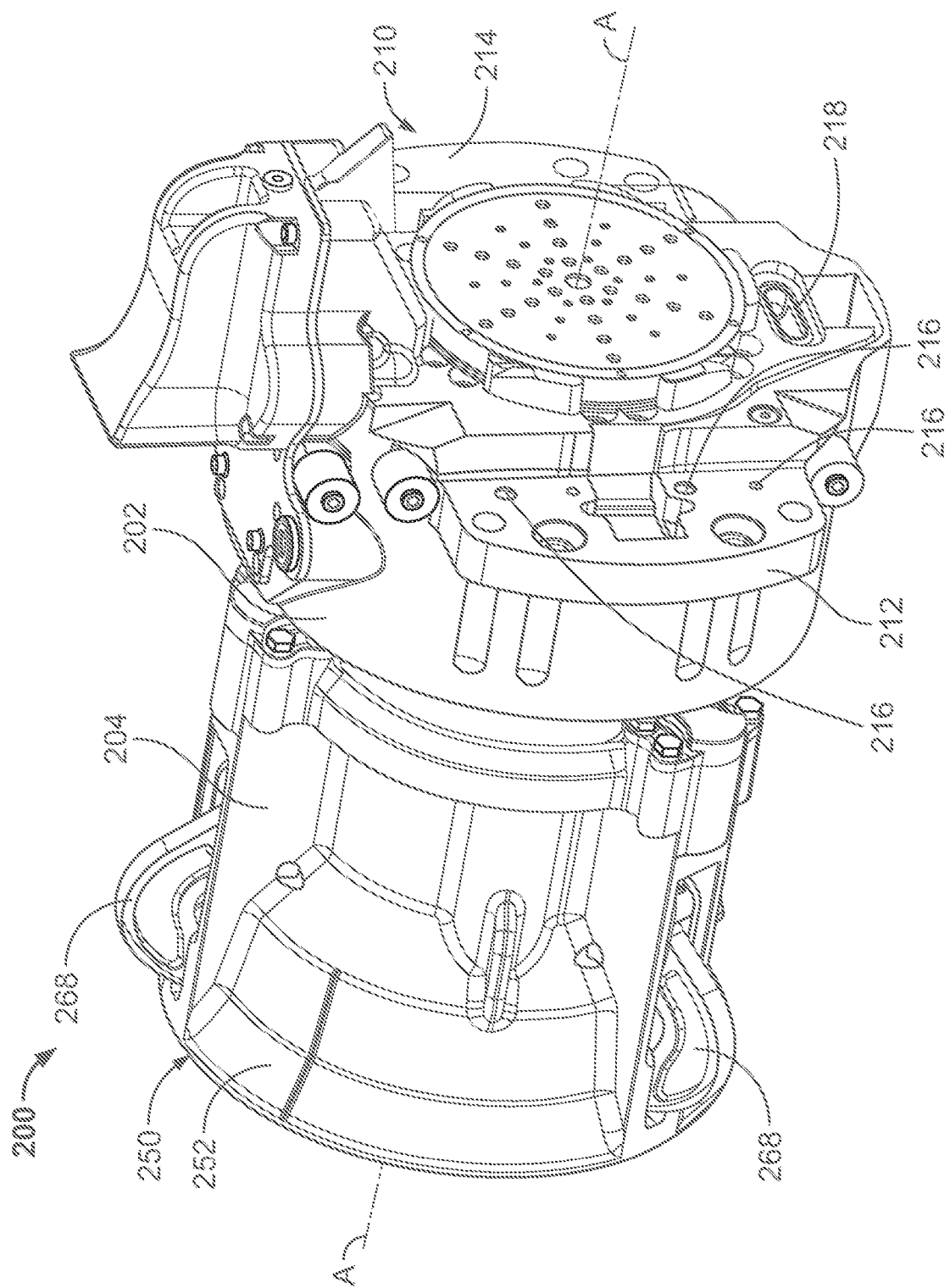
FIG. 2B is a rear, top perspective view of the example tool interchange.

FIGS. 2A and 2B are front and rear, top perspective views of an example tool interchange 200 constructed in accordance with the concepts herein that can be used as tool interchange 20. The tool interchange 200 includes a first interchange body 202 that carries a second interchange body 204 so that the second interchange body 204 can rotate, relative to the first interchange body 202, on a rotation axis A-A. Here, the rotation axis A-A extends longitudinally through the center of the interchange tool 200 (the tool 200, here, is generally cylindrical and the axis A-A is through the center of the cylinder). But, in other instances, the axis A-A could be offset from the center of the tool 200. The tool interchange 200 is actuable, via a motor (discussed in more detail below) to drive the second interchange body 204 to rotate on the first interchange body 202. The first interchange body 202 is adapted to physically affix to the manipulator arm of an ROV, and communicate hydraulically, electrically and/or optically with the systems of the ROV, via the manipulator arm. The second interchange body 204 is adapted to receive and grip and ROV tool, and communicate hydraulically, electrically and/or optically with an ROV tool, such as tool 18.

In FIG. 2B, the first interchange body 202 is shown with an ROV manipulator arm mount 210 at one end. The ROV manipulator arm mount 210 has two outwardly extending flanges 212. The flanges can be affixed, e.g., bolted and/or otherwise, to corresponding flanges on the manipulator arm to mechanically affix the interchange body 202 to the manipulator arm. The ROV manipulator arm mount 210 defines a portion of the back face 214 of the first interchange body 202, and includes a plurality of hydraulic ports 216 that correspond to ports on the manipulator arm. The ports 216 seal with the corresponding ports of the manipulator arm (e.g., with o-rings, gaskets and/or otherwise) to allow communication of hydraulic fluid between the tool interchange 200 and the ROV via hydraulic passages and hoses of the manipulator arm. The back face 214 can additionally include pass-throughs 218 for electric and fiber-optics that allow communication of electrical power, electrical communications and optical communications between the ROV and the tool interchange 200, via electrical conductors and fiber-optics of the manipulator arm. Fewer or additional pass-throughs and/or ports can be provided. Notably, each of the pass-throughs need not be dedicated to one wire or one fiber-optic, but rather can accommodate bundled cables with multiple electrical conductors/fiber-optics within the cable.

In FIG. 2A, the second interchange body 204 is shown with a tool mount 250 at its end opposite the manipulator arm mount 210. The tool mount 250 is actuable between gripping the ROV tool to the second interchange body 204, so that the manipulator arm can operate the tool, and releasing the ROV tool from the second interchange body 204, so that the tool can be replaced with a different tool. The tool mount 250 includes an outer perimeter wall 252 that defines, internally, the tool receiving receptacle 254 within the wall 252.

Figure 3:
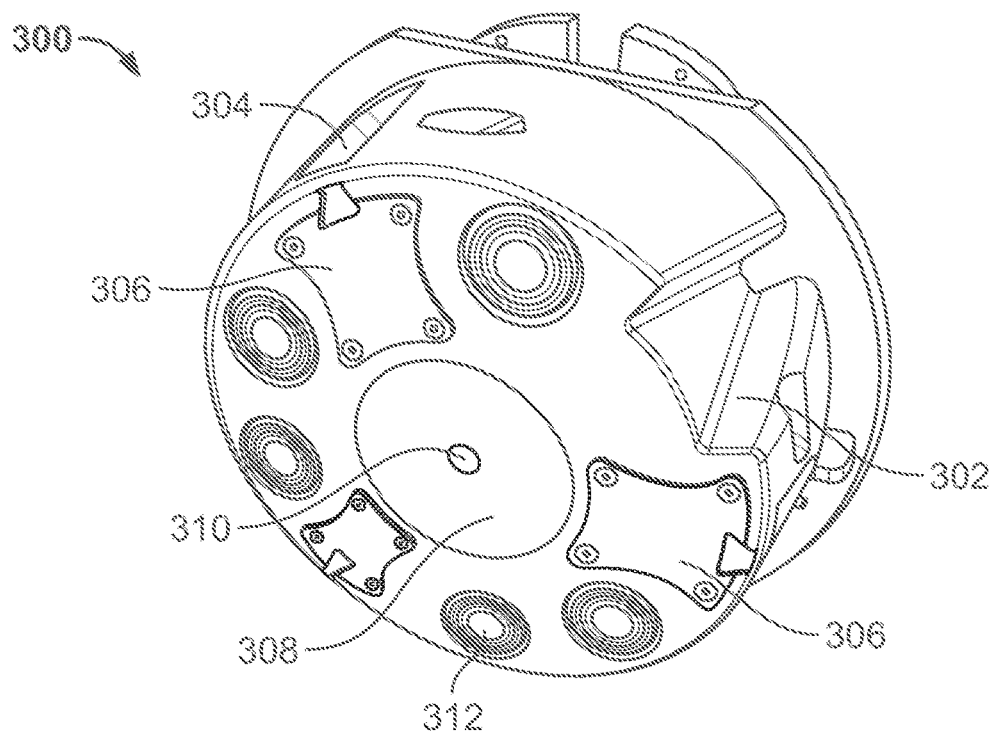
FIG. 3 is a front, top perspective view of an example male mount for use with the example tool interchange of FIGS. 2A and 2B.

Referring also to FIG. 3, the ROV tool is provided with a male mount 300 on one end that is designed to be docked in and closely received within the tool receiving receptacle 254. In certain instances, the perimeter wall 252 is slightly conical or converges towards the rotation axis A-A to guide the male mount 300 into the receptacle 254 and center it on the rotation axis A-A. A rotational alignment key 256 protrudes radially inward from the perimeter wall 252, proud of the back wall 258 of the tool receiving receptacle 254. The male mount 300 includes a corresponding keyway 302 that receives the rotational alignment key 256 as the male mount 300 is docked into the receptacle 254. The key 256 and keyway 302 mate to rotationally align the male mount 300 with the tool mount 250. In certain instances, the rotational alignment key 256 can be narrower near the top of the perimeter wall 252 and wider near the back wall 258 and the keyway 302 provided with a corresponding shape to increasingly, more finely rotationally align the male mount 300 with the tool mount 250 as the rotational alignment key 256 is received deeper into the keyway 302.

Figure 4:
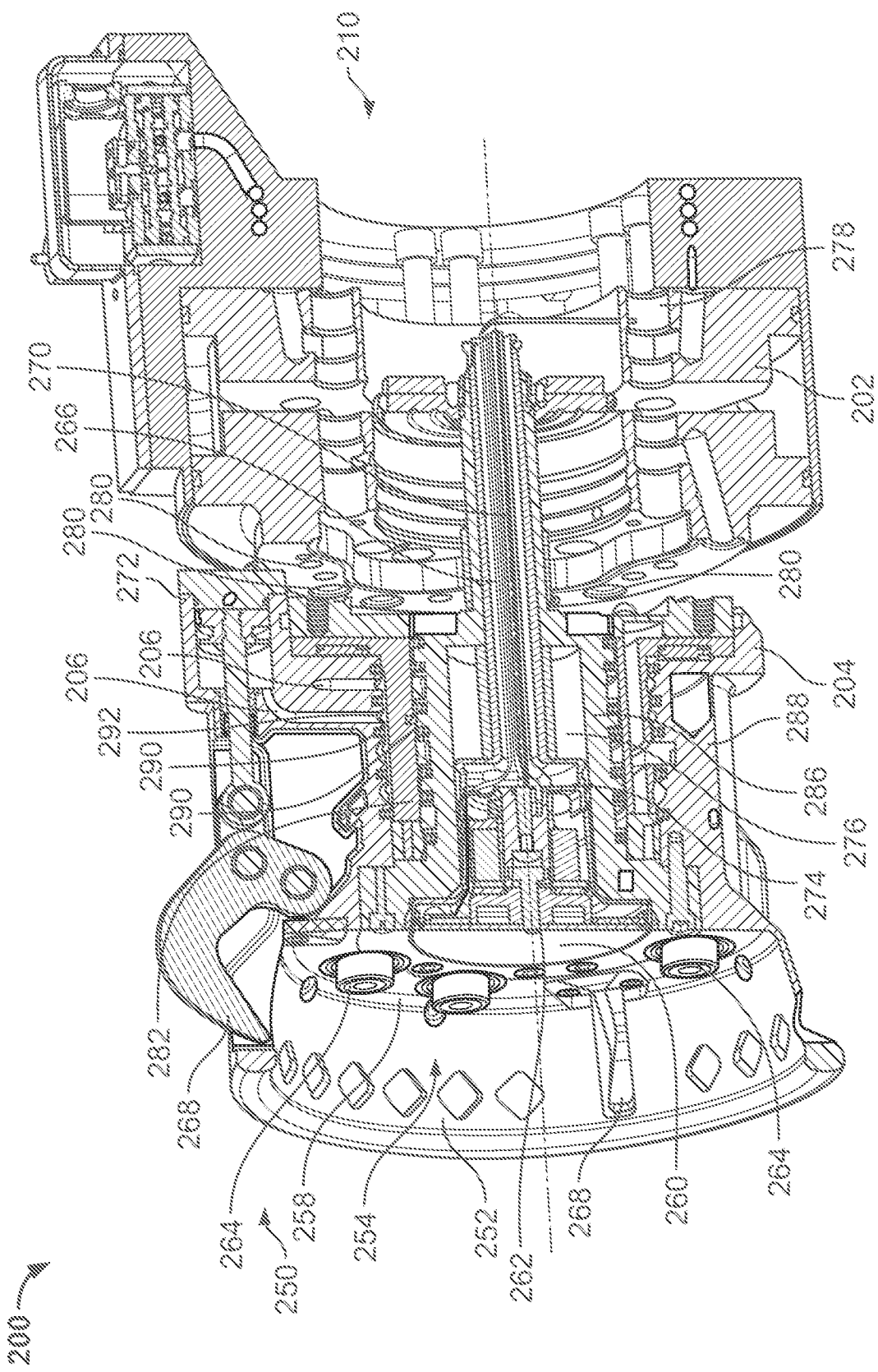
FIG. 4 is a side cross-sectional view of the example tool interchange with some aspects omitted.

The tool mount 250 includes one or more latches 268 (three shown at 120° spacing) pivotally mounted to the perimeter wall 252, and actuable between a latched position and an unlatched position. FIG. 2A, and also FIG. 4, shows the latches 268 as being hook shaped, but the latches 268 could be another configuration. The figures also show the latches 268 in their unlatched position, positioned outward, out of the interior of the tool receiving receptacle 254. In response to a signal communicated by the ROV to the interchange tool 200, the latches 268 are actuated to pivot inward toward the rotation axis A-A to the latched position.

Referring briefly to FIG. 4, the latches 268 are coupled to a piston/cylinder 272 (one per latch 268) that, in response to supplied hydraulic fluid, actuates the latches 268 between the latched and unlatched positions. The piston/cylinders 272 can be in hydraulic communication with the ROV via one or more of the hydraulic ports 216, enabling the ROV to supply hydraulic fluid to the piston/cylinder 272 to actuate the latches 268.

As seen in FIG. 3, the male mount 300 includes grip pockets 304 around its outer perimeter. The grip pockets 304 correspond in number to the latches 268. When the male mount 300 is docked within the tool receiving receptacle 254, the latches 268 reside around the outer perimeter of the male mount 300. Moreover, when the male mount 300 is docked within the tool receiving receptacle 254 and rotationally aligned by the key 256 and keyway 302, the grip pockets 304 correspond in position to the latches 268. When the latches 268 are pivoted inwards to the latched position, they enter the corresponding grip pockets 304 and clamp the male mount 300 in the docked position, fully received within the tool receiving receptacle 254. In this position, the end wall 306 of the male mount 300 abuts the back wall 258 of the tool receiving receptacle 254. When the latches 268 are pivoted outwards to the unlatched position, they release from within the corresponding grip pockets 304 and allow the male mount 300 to be withdrawn from the tool receiving receptacle 254. Notably, in certain instances, the latches 268 and corresponding grip pockets 304 positioned around the perimeter of the tool interchange 200 enables a more axially compact assembly of the tool interchange 200 and male mount 300 than latches and pockets inboard. This is because the outboard latches 268 and grip pockets 304 allow other aspects of the interface to be nested inboard at the same axial position as the latches 268 and grip pockets 304.

Referring specifically to FIG. 2A, the back wall 258 of the tool mount 250 includes an inductive power coupling part 260 and a fiber-optic coupling part 262. The inductive power coupling part 260 and fiber-optic coupling part 262 are both presented outwardly in the tool mount 250, in a direction opposite from the first interchange body 202, so that when the male mount 300 is docked in the tool receiving receptacle 254, the inductive power coupling part 260 and fiber-optic coupling part 262 face the male mount 300. The inductive power coupling part 260 has a generally planar surface and, in FIG. 2A, is shown as being circular in shape (but it could be other shapes). Both the inductive power coupling part 260 and fiber-optic coupling part 262 are centered on the rotation axis A-A and are fixed with respect to the first interchange body 202, so that when the second interchange body 204 rotates the inductive power coupling part 260 and fiber-optic coupling part 262 remain stationary.

Referring also to FIG. 3, the end wall 306 of the male mount 300 includes a corresponding inductive power coupling part 308 and a corresponding fiber-optic coupling part 310. The corresponding inductive power coupling part 308 is positioned so that when the male mount 300 is docked in the tool receiving receptacle 254 of the tool mount 250, the corresponding inductive power coupling part 308 is adjacent, but spaced apart from (e.g., not touching) the inductive power coupling part 260 of the tool mount 250. Likewise, the corresponding fiber-optic coupling part 310 is positioned so that when the male mount 300 is docked in the tool receiving receptacle 254, the corresponding fiber-optic coupling part 310 is adjacent, but spaced apart from (e.g., not touching) the fiber-optic coupling part 262 of the tool mount 250. Thus, when the second interchange body 204 is rotated on the rotation axis A-A, the coupling parts 260, 308, 262, 310 do not contact and wear on each other.

The inductive power coupling part 260 is configured to induce power in the corresponding inductive power coupling part 308 when contacting or even across an intervening gap to supply power to the tool attached to the male mount 300. Such an inductive power coupling is not dependent upon contact for efficient transfer of power, and is thus less susceptible to debris which may float in between the coupling parts 260, 308. Also, such non-contact inductive and fiber-optic couplings can be less complex, with fewer parts to fail and take up less space within the interchange tool 200 than typical contact-type slip couplings. The resulting tool interchange can be more compact, which improves dexterity of the ROV with the tool. The inductive power coupling part 260 has a large area, shown in FIG. 2A as having a diameter approximately half the diameter of the back wall 258 to facilitate high power transfer. In certain instances, the inductive power coupling is a resonant inductive coupling, with one or both parts including a resonant circuit. The inductive power coupling part 260 and corresponding inductive power coupling part 308 can be sized as needed to efficiently communicate the amount of power needed to operate the tool. Moreover, in certain instances, the inductive power coupling can provide increased power transmission to the ROV tool over other types of connectors or couplings, enabling higher power consumers to be utilized in the ROV tool such as electro hydraulic valves (solenoids, proportional, servo), lights and electric motors as opposed to simply low power sensors.

The fiber-optic coupling part 262 is configured to communicate data (e.g., signals) with the corresponding fiber-optic coupling part 310 across the intervening gap to allow the ROV to communicate with the tool attached to the male mount 300. The fiber-optic coupling, for example, allows the ROV access to sensors in the tool, as well as enable other data exchange between the tool and ROV.

Referring back to FIG. 2A, the back wall 258 of the tool mount 250 includes one or more hydraulic connector parts 264 (five shown). The hydraulic connector parts 264 are presented outwardly in the tool mount 250, in a direction opposite from the first interchange body 202, so that when the male mount 300 is docked in the tool receiving receptacle 254, the hydraulic connector parts 264 face the male mount 300. The hydraulic connector parts 264 are positioned radially outboard of the inductive power coupling part 260. Referring also to FIG. 3, the end wall 306 of the male mount 300 includes corresponding hydraulic connector parts 312, which may correspond in number to the hydraulic connector parts 264. When the male mount 300 is docked in the tool receiving receptacle 254, the corresponding hydraulic connector parts 312 also correspond in position to the hydraulic connector parts 264. The hydraulic connector parts 264 are spring biased to protrude outward from the back wall 258 and to compress inward, driven by the corresponding hydraulic connector parts 312, as the male mount 300 moves into a fully docked position. Thereafter, because of the key 256 being mated in the keyway 302 of the male mount 300 and because of the clamping force of the latches 268, when the second interchange body 204 rotates relative to the first interchange body 202, the male mount (and thus tool) rotate with the second interchange body. The mated hydraulic connector parts 264, 312 thus move in unison and remain connected.

Figure 5:
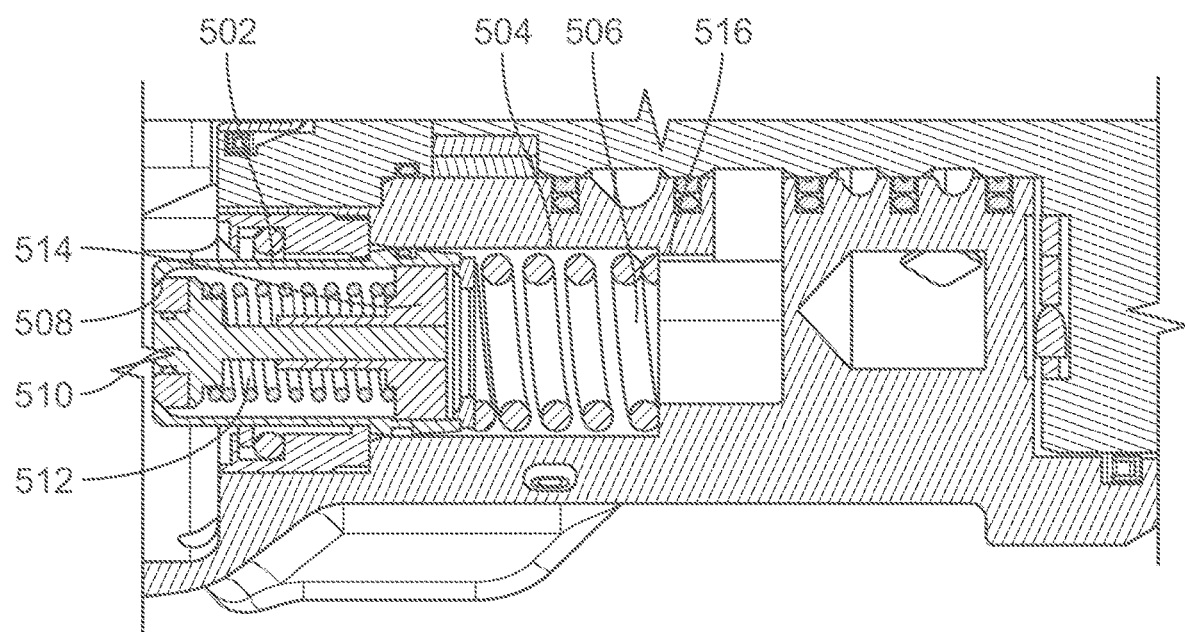
FIG. 5 is a detail side cross-sectional view focused on a hydraulic connector part of the example tool interchange.

The details of the hydraulic connector part 264 can be better seen in FIG. 5. The hydraulic connector part 264 includes an outer housing 502 telescopically received in a bore 504 in the second interchange body 204. A spring 506 resides between a shoulder 516 and a lower end of the housing 502, biasing the housing outward from the back wall 258 of the tool receiving receptacle 254. When the corresponding hydraulic connector part 312 moves against the housing 502, it compresses the spring 506 and pushes the housing into the bore 504. The spring 506 maintains pressure between the hydraulic connector part 264 and the corresponding hydraulic connector part 312 facilitating a robust hydraulic seal between the components. The outlet end of the housing 502 includes an aperture 508 plugged by a poppet valve 510 with a poppet valve seal on its end. A second spring 512 resides between the shoulder 514 in the interior of the housing 502 and the poppet valve 510, biasing the poppet valve 510 into sealing engagement with the interior of the aperture 508. When the corresponding hydraulic connector part 312 contacts the hydraulic connector part 264, it pushes the poppet valve 510 away from the aperture 508 allowing flow through the aperture 508 and between the hydraulic connector parts 312, 264.

Referring back to FIG. 4, the electrical conductors 266, e.g., wires, and fiber-optic line 270 that supply the inductive coupling part 260 and the fiber-optic coupling part 262 reside in a central housing 274 fixed to the first interchange body 202. The central housing 274 is centered on the axis A-A through the second interchange body 204. The central housing 274 carries the inductive coupling part 260 and fiber-optic coupling part 262, supporting these couplings in position at the back wall 258 of the tool receiving receptacle 254. The second interchange body 204 defines an internal cavity 276 that receives the central housing 274, and the second interchange body 204 is carried by the first interchange body 202 to rotate around the central housing 274. Although omitted from FIG. 4 to show other features of the interchange, a motor (e.g., electric, hydraulic and/or other) can be positioned between the first interchange body 202 and the second interchange body 204 to effectuate rotation of the second interchange body 204 relative to the first interchange body 202. The pass through 218 for the electrical conductors and fiber-optic lines connects to an end of the central housing 274 through a passage 278 in the first interchange body 202, so that the electrical conductors 266 and fiber-optic line 270 can be connected to the inductive coupling part 260 and the fiber-optic coupling part 262.

The hydraulic ports 216 connect through hydraulic passages 280 in the first interchange body 202 to an annular manifold body 282 affixed to the first interchange body 202. The annular manifold body 282 is generally cylindrical, with cylindrical outer and inner surfaces. The annular manifold body 282 is received in an annular void defined in the second interchange body 204, outboard of the cavity 276 that receives the central housing 274. In FIG. 4, the second interchange body 204 is constructed in multiple parts, including an inner housing 286 that is affixed to an outer portion 288 of the second interchange body 204 and defines the cavity 276 that receives the central housing 274. In other instances, the second interchange body 204 can have fewer or more parts.

The inner housing 286 carries a number of seals 290 on its outer surface that abut with and seal to the inner surface of the annular manifold body 282 defining a number of sealed annular passages 292 that are fluidically isolated from one another. In FIG. 4, there are three sealed annular passages 292 around the inside of the annular manifold body 282, but in other instances, there could be fewer or more passages. The outer portion 288 of the second interchange body 204 also carries a number of seals 290 on its inner surface that abut with and seal to the outer surface of the annular manifold body 282. These seals 290 also define a number of sealed annular passages 292 that are isolated from one another. In FIG. 4, there are four sealed annular passages 292 around the outside of the annular manifold body 282, but again, in other instances, there could be fewer or more passages.

Figure 6:
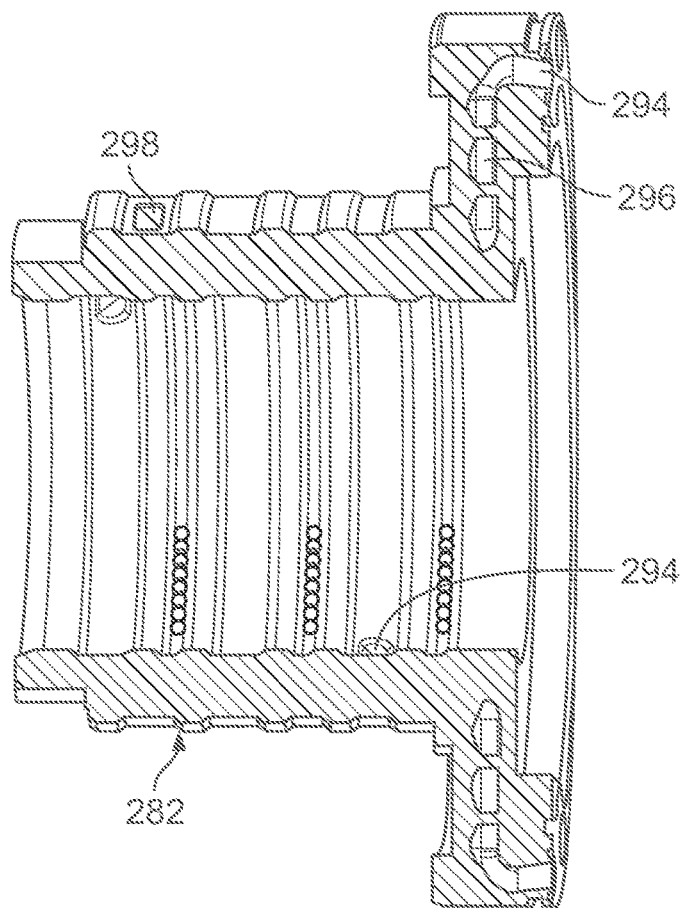
FIG. 6 is a detail, partial side cross-sectional view of a manifold body of the example tool interchange.

Referring to FIG. 6, the end of the annular manifold body 282 that abuts the first interchange body 202 includes hydraulic endwall ports 294 that correspond in number and position to the hydraulic passages 280 in the first interchange body 202, so that they seal up to and fluidically communicate with the hydraulic passages 280 when the annular manifold body 282 is affixed to the first interchange body 202. The hydraulic ports 294 communicate fluid with internal passages 296 within the annular manifold body 282, which in turn, communicate fluid with selected ones of a number of sidewall ports 298 into the annular passages 292. As seen in FIG. 4, the second interchange body 204 includes a network of hydraulic passages 206 that fluidically communicate with the annular passages 292. The hydraulic passages 206 communicate hydraulic fluid with various aspects of the tool interchange 200, including the hydraulic connector parts 264, the piston/cylinder 272, and/or other aspects of the tool interchange 200. Thus, internal passages 296 of the annular manifold body 282 effectuate specified fluidic connections between the ports 216 in the first interchange body 202 and the various aspects of the tool interchange 200 so that the ROV can communicate fluid with these aspects to control the tool interchange 200 and communicate fluid with a docked ROV tool.

By way of example, the two passages 206 visible in FIG. 5 can be designated latch control passages, because they connect to opposing sides of the piston/cylinder 272. Each connects to a different one of the isolated annular passages 292, enabling the ROV to apply hydraulic pressure to corresponding ports 216 in the first interchange body 202 to independently and selectively pressurize these passages. The by applying pressure to the corresponding port 216, the ROV can actuate the latches 268 between a latched and unlatched position.

Because the annular manifold body 282 is fixed to the first interchange body 202, the second interchange body 204 rotates around the annular manifold body 282 as the second interchange body 204 is rotated on the rotation axis A-A. Because of their annular arrangement, the seals 290 remain in sealing contact with the annular manifold body 282 and maintain the annular passages 292 isolated from one another. Also, because they passages 292 are annular, they continue to provide communication between the sidewall ports 298 in the annular manifold body 282 and the passages 206 of the second interchange body 204. Thus, the fluidic connections between the ports 216 in the first interchange body 202 and the various aspects of the tool interchange 200 are maintained while the second interchange body 204 rotates and regardless of its angular orientation. In other words, the ROV can communicate fluid with these aspects to control the tool interchange 200 and communicate fluid with a docked ROV tool while the second interchange body 204 is being rotated and regardless of its angular orientation. The arrangement eliminates the need for connecting hoses between the bodies 202, 204 that may twist up and limit the rotation of the second interchange body 204.

In operation, with reference to FIGS. 2A, 2B and 3, the male mount 300 of an ROV tool is received into the tool mount 250 of the tool interchange 200 while the tool interchange 200 is coupled to an ROV manipulator arm. If the male mount 300 is angularly misaligned with the tool mount 250, the second interchange body 204 can be rotated until the key 256 of the tool mount 250 drops into the key way 302 of the male mount 300 allowing the male mount 302 to descent to the fully docked position or close to the fully docked position within the tool receiving receptacle 254. The ROV operator then actuates the ROV to supply hydraulic pressure on the hydraulic channel corresponding to the piston/cylinders 272 to actuate the latches 268 from an unlatched position to a latched position which will draw the male mount to the fully docked position. In the latched position, the latches 268 grip the ROV tool to the tool mount 250. Thereafter, the tool interchange 200 can inductively communicate power with the ROV tool via the inductive coupling 260, 308, communicate data (e.g., signals) with the ROV tool via the fiber-optic coupling 262, 310, and communicate hydraulically with the ROV tool via the hydraulic connectors 264, 312. These various forms of communication can occur while the second interchange portion 204 is being rotated relative to the first interchange portion 202, for example during manipulation and operation of the tool, and regardless of the angular orientation of the second interchange portion 204 relative to the first interchange portion.

While a number if implementations have been described, it should be appreciated that the concepts herein are not limited to those implementations. Rather, other changes, substitutions, and alterations are also possible without departing from this disclosure.

We claim:

1. A tool interchange for a submersible remote operated vehicle (ROV) arm, the tool interchange comprising:
   a first interchange body that affixes to the ROV arm;
   a second interchange body carried by the first interchange body to rotate on a rotation axis, the second interchange body comprising a tool mount actuable between gripping an ROV tool to the second interchange body and releasing the ROV tool from the second interchange body, the second interchange body including:
      an inductive power coupling part in the tool mount, the inductive power coupling part presented outwardly in the tool mount, residing on the rotation axis and fixed with respect to the first interchange body, the inductive power coupling part adapted to inductively communicate power with a corresponding inductor power coupling part of the ROV tool when the ROV tool is docked in the tool mount;
   a central housing fixed to the first interchange body and extending along the rotation axis, the central housing comprising the inductive power coupling part, where the second interchange body is carried to rotate around the central housing; and
   a plurality of hydraulic connector parts on the second interchange body within the tool receiving receptacle and radially outboard of the inductive power coupling part, the hydraulic connector parts adapted to communicate hydraulic pressure with corresponding hydraulic connector parts of the ROV tool and carried to rotate with the second interchange body;
   where the hydraulic connector parts are each spring biased to protrude outward of a surface of the tool receiving receptacle and to compress in mating engagement with the corresponding hydraulic connector parts on the ROV tool.

2. The tool interchange of claim 1, comprising a fiber-optic coupling part in the tool mount, residing on the rotation axis, and fixed with respect to the first interchange body, the fiber-optic coupling part adapted to communicate with a corresponding fiber-optic coupling part of the ROV tool when the ROV tool is docked in the tool mount.

3. The tool interchange of claim 2, where the fiber-optic coupling part is adapted to communicate with the corresponding fiber-optic coupling part of the ROV tool when the parts are spaced apart.

4. The tool interchange of claim 2, where the second interchange body defines an internal cavity that receives the central housing.

5. The tool interchange of claim 1, where the inductive power coupling part comprises a resonant inductive power coupling part adapted to inductively communicate power with the corresponding inductive power coupling part of the ROV tool when the parts are spaced apart.

6. The tool interchange of claim 1, where the tool mount comprises:
   a perimeter wall defining a tool receiving receptacle within the wall; and
   a latch on the perimeter actuable between a latched position, pivoted inward toward the rotation axis to grip the ROV tool into the tool receiving receptacle and an unlatched position, pivoted outward to release the ROV tool from the second interchange body.

7. The tool interchange of claim 6, comprising a tool rotational alignment key adjacent the perimeter wall and extending into the tool receiving receptacle.

8. The tool interchange of claim 1, comprising an annular manifold fixed with respect to the first interchange body and extending into the second interchange body, the annular manifold comprising:
- a manifold body with a cylindrical outer surface;
- a first hydraulic passage in the manifold body, the first hydraulic passage in fluid communication with a first corresponding hydraulic passage of the first interchange body and comprising a first sidewall port on the cylindrical outer surface;
- a second hydraulic passage in the manifold body, the second hydraulic passage in fluid communication with a second corresponding hydraulic passage of the first interchange body and comprising a second sidewall port on the cylindrical outer surface; and
- a seal on the manifold body between the first hydraulic passage and the second hydraulic passage, the seal sealing between the cylindrical outer surface and the second interchange body.

9. The tool interchange of claim 8, comprising a latch control hydraulic passage in the second interchange body that is in fluid communication with the first hydraulic passage and isolated from the second hydraulic passage and where the second hydraulic passage is in fluid communication with a hydraulic connector part adapted to communicate hydraulic pressure with a corresponding hydraulic connector part of the ROV tool.

10. A method, comprising:
- receiving an ROV tool at least partially within a tool receptacle of a tool mount of a tool interchange coupled to an ROV arm;
- gripping the ROV tool at the tool interchange in response to a signal; and
- inductively communicating power between the ROV and the ROV tool through an inductive power coupling part, the inductive power coupling part rotatably fixed such that the inductive power coupling part does not rotatably move relative a rotation axis of the tool interchange during gripping of the ROV tool, the inductive power coupling part is aligned with a central housing that extends along the rotation axis and carries electrical conductors to the inductive power coupling part;
- where inductively communicating power comprises inductively communicating power across a gap between a first inductive coupling part of the tool interchange and a second inductive coupling part of the ROV tool; and
- where gripping the ROV tool comprises moving latches that are on the outermost perimeter of the tool interchange from an unlatched position inward to a latched position to grip the ROV tool, the method further comprising releasing the ROV tool, where releasing the ROV tool comprises moving the latches from the latched position outward to an unlatched position.

11. The method of claim 10, wherein the central housing comprises the inductive power coupling part.

12. The method of claim 10 further comprising communicating signals between the ROV and the ROV tool through a fiber-optic coupling residing on the rotation axis.

13. A tool interchange for a submersible remote operated vehicle (ROV) arm, the tool interchange comprising:
- a first interchange body that affixes to the ROV arm;
- a second interchange body carried by the first interchange body to rotate on a rotation axis, the second interchange body including:
  - an inductive power coupling part in the tool mount, the inductive power coupling part presented outwardly in the tool mount, residing on the rotation axis and fixed with respect to the first interchange body, the inductive power coupling part adapted to inductively communicate power with a corresponding inductor power coupling part of the ROV tool when the ROV tool is docked in the tool mount;
- a central housing fixed to the first interchange body and extending along the rotation axis, the central housing comprising the inductive power coupling part, where the second interchange body is carried to rotate around the central housing; and
- where a fiber-optic coupling part is adapted to communicate with a corresponding fiber-optic coupling part of the ROV tool when the parts are spaced apart.

14. The tool interchange of claim 13, wherein the second interchange body comprising a tool mount actuable between gripping an ROV tool to the second interchange body and releasing the ROV tool from the second interchange body.

15. The tool interchange of claim 13, where the inductive power coupling part comprises a resonant inductive power coupling part adapted to inductively communicate power with the corresponding inductive power coupling part of the ROV tool when the parts are spaced apart.

16. The tool interchange of claim 13, where the tool mount comprises:
- a perimeter wall defining a tool receiving receptacle within the wall; and
- a latch on the perimeter actuable between a latched position, pivoted inward toward the rotation axis to grip the ROV tool into the tool receiving receptacle and an unlatched position, pivoted outward to release the ROV tool from the second interchange body.

* * * * *